Oct. 5, 1965  H. D. ELSE ETAL  3,210,643
ELECTROSTATIC GENERATOR
Filed Dec. 22, 1960  2 Sheets-Sheet 1

WITNESSES
Edwin E. Bassler
James F. Young

INVENTORS
Harry D. Else, Robert C. Fear
& Robert W. Briggs
BY
ATTORNEY

United States Patent Office 3,210,643
Patented Oct. 5, 1965

3,210,643
ELECTROSTATIC GENERATOR
Harry D. Else, Wapakoneta, and Robert C. Fear and Robert W. Briggs, Lima, Ohio, assignors to Westinghouse Electric Corporation, East Pittsburgh, Pa., a corporation of Pennsylvania
Filed Dec. 22, 1960, Ser. No. 77,592
5 Claims. (Cl. 322—2)

The present invention relates to electrostatic generators, and more particularly to an electrostatic generator which requires no electrical contacts or current transfer to a moving element.

Electrostatic generators are very efficient sources of high voltage direct current and have been used to some extent as laboratory sources of high voltage and for such applications as supplying X-ray machines. They have also been proposed for central station use for high voltage direct current transmission and as power sources for certain types of propulsion systems for space vehicles.

Several types of electrostatic generators have been proposed, and the present invention relates in particular to the movable plate type of generator. In this type of electrostatic generator, as heretofore proposed, relatively movable plates, or sets of plates, are oppositely charged and the capacitance between the plates is varied by movement of one set of plates relative to the other, thus correspondingly varying the output voltage. In these prior movable plate generators, the stationary plates were charged with one polarity and the movable plates were oppositely charged. This construction therefore requires electrical contact to be made to the movable plates by means of brushes or some equivalent means. The use of brushes is undesirable, however, because of the necessary maintenance, and the inherent unreliability of any type of contact to a moving member makes it especially undesirable where maintenance is difficult or where the machine is not readily accessible for inspection and maintenance. Furthermore, these machines necessarily operate either in air or other gas at relatively high pressure or in a very high vacuum, in order to obtain the necessary dielectric strength between the oppositely charged plates to permit relatively close spacing. For operation in vacuum the use of brushes is not satisfactory and in general any type of contact to a movable member is not sufficiently reliable in a vacuum for practical use.

The principal object of the present invention is to provide an electrostatic generator suitable for either high pressure or high vacuum operation in which no electrical contact or current transfer to a movable element is required.

Another object of the invention is to provide an electrostatic generator of the movable plate type in which the movable plates are rotated between sets of oppositely charged stationary plates in such a manner that the net charge on the movable plates is always zero and no electrical contact to the movable plates is required.

A further object of the invention is to provide an electrostatic generator in which oppositely charged sets of stationary plates are spaced from each other and a set of movable plates rotates between the stationary plates to vary the capacitance between them, providing a generator of simple construction and minimum size for a given output, with the further advantage of requiring no brushes or other contact means for making contact to the rotating plates so that it is well adapted for high vacuum operation.

Other objects and advantages of the invention will be apparent from the following detailed description, taken in connection with the accompanying drawings, in which.

Figure 1:
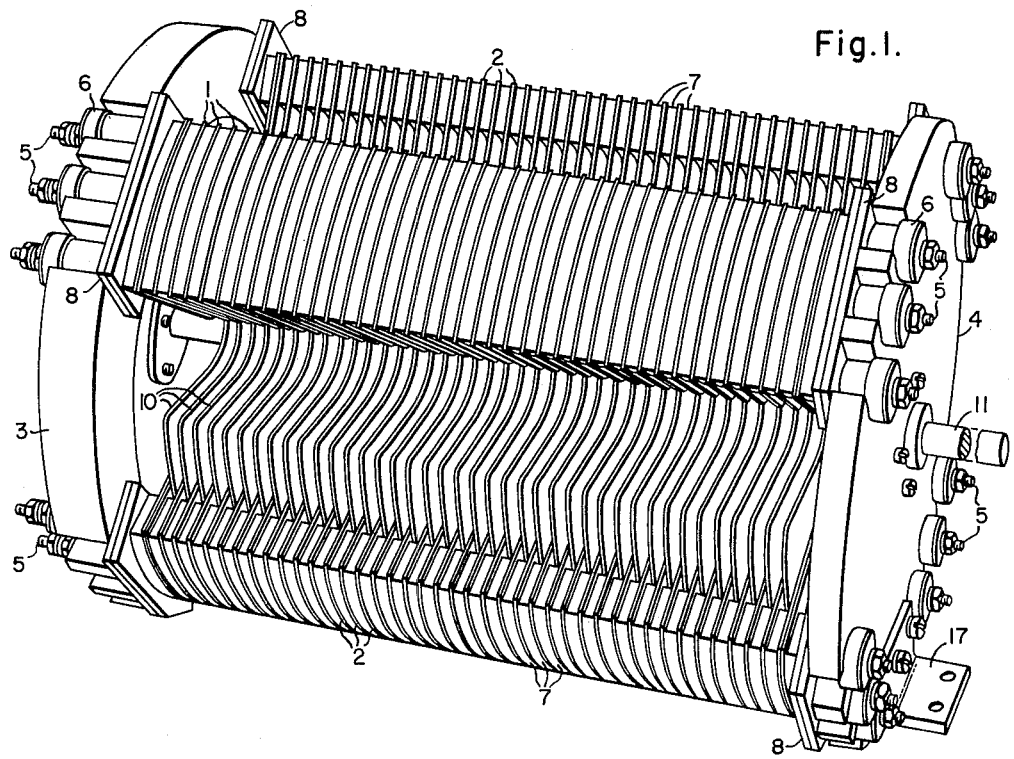
FIGURE 1 is a perspective view of an electrostatic generator embodying the invention.

An illustrative embodiment of the invention is shown in the drawing. As there shown, the stator member of the machine comprises a plurality of spaced sets of stationary conducting plates 1 and 2. In the illustrated embodiment, the plates 1 and 2 are supported between spaced end plates 3 and 4 which may be metal plates of suitable size or which may be of any material of sufficient mechanical strength. The machine shown in the drawing for the purpose of illustration is a four pole machine having four sets of stationary plates. The plates 1 and 2 are supported on four sets of longitudinal conducting rods 5 which extend between the end plates 3 and 4 and are insulated from them by insulating bushings 6 at both ends of the rods. Three rods 5 are shown for each set, although it will be understood that any necessary or sufficient number of rods might be used to obtain the required rigidity. The four sets of rods 5 are equally spaced apart circumferentially of the end plates 3 and 4 as shown.

Figure 3:
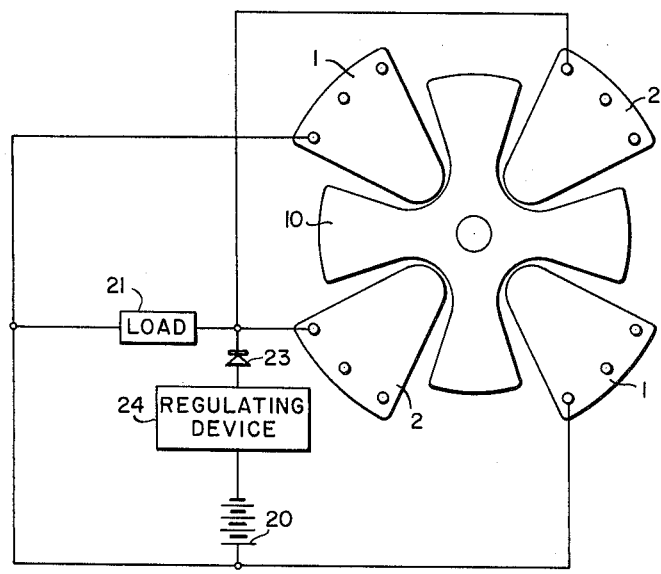
FIG. 3 is a somewhat diagrammatic transverse view showing the configuration of the plates and a simplified diagram of a typical electrical circuit.
Figure 2:
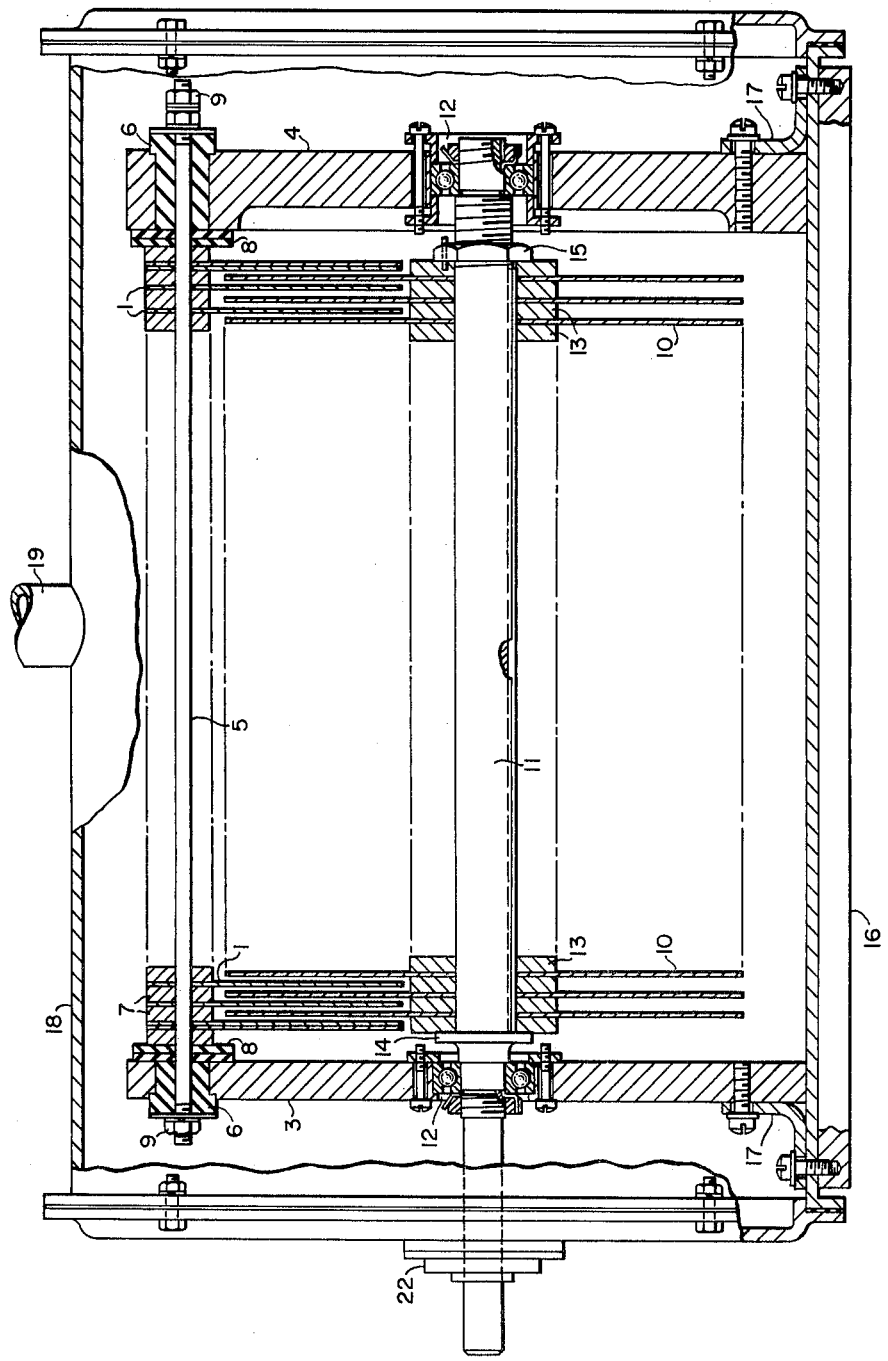
FIG. 2 is a longitudinal sectional view of the generator.

The four sets of rods 5 carry oppositely charged sets of stationary plates 1 and 2. The plates 1 and 2 are generally sector shaped, as shown in FIG. 3, and may be provided with holes for the reception of the rods 5. The plates are made of any suitable conducting material, such as aluminum, and are closely spaced on the rods 5 as shown in FIG. 2. The plates 1 and 2 are held in accurately spaced relation by conducting spacers 7, which may also be of aluminum, and if necessary copper shims may be utilized to adjust the spacing. The plates are thus equally longitudinally spaced from each other and the sets of plates are insulated from the end plates 3 and 4 by insulating members 8 at each end. The entire structure is clamped together by nuts 9 threaded on the ends of the rods 5. It will be seen that the plates of each set are in electrical contact with each other and with the rods 5, and the ends of the rods are utilized as electrical terminals for the sets of plates. Each set of stationary plates thus consists of a number of axially aligned conducting plates which are spaced from each other and in electrical contact with each other. The four sets of plates are angularly spaced apart about the axis of the machine with a spacing between them which is preferably at least equal to the angular extent of the sector shaped plates.

The rotor of the machine consists of a plurality of conducting plates 10 carried on a shaft 11 which is supported for rotation in bearings 12 of any suitable type in the end plates 3 and 4. The movable plates 10 are also made of a suitable conducting material such as aluminum and, as shown in FIG. 3, the plates 10 have four radial projections or lobes or, in general, a number of radial projections equal to the number of sets of stationary plates. The movable plates 10 are spaced from each other on the shaft 11 by means of spacers 13, which may be of aluminum or other suitable material, either conducting or non-conducting, and the plates 10 are clamped against a shoulder 14 on the shaft by means of a nut 15, or are otherwise firmly clamped together.

The plates 10 are spaced apart axially a distance substantially equal to the axial spacing between the stationary plates 1 and 2 and are positioned so as to be interleaved with the stationary plates when the lobes of the movable plates are aligned with the stationary plates. Thus, the shaft 11 is free to rotate and the lobes of the plates 10 move in and out of axial alignment with the stationary plates as the shaft rotates. The lobes of the movable plates 10 are preferably made somewhat less in angular extent than the angular spacing between the sets of stationary plates, as shown in FIG. 3.

The generator is shown as being mounted on a base 16 of any suitable type by means of brackets 17 attached to the base and to the end plates. A gas-tight enclosing housing 18 is also shown attached to the base 16 and completely enclosing the generator. It is desirable to make the axial spacing between the stationary and movable plates quite small and since they may be charged to relatively high potential with respect to each other, it is necessary for the spaces between the plates to have relatively high dielectric strength. In order to obtain the necessary dielectric strength, the generator may operate in an atmosphere of air or other gas at a pressure of at least several atmospheres, or it may operate in a high vacuum of the order of at least $10^{-4}$ mm. of mercury. The enclosing housing 18 is provided for this purpose, and a suitable connection 19 is provided in the housing for evacuating the housing or for introducing air or other suitable gas under the necessary pressure. As previously indicated, the generator of the present invention is particularly well suited for operation in vacuum and any suitable type of vacuum equipment may be utilized for evacuating the housing 18 to the desired extent. It will be understood, of course, that where the machine is to operate under ambient conditions such as would prevail on a space vehicle, for example, where a vacuum is normally present, the housing 18 could be omitted.

Alternate sets of stationary plates 1 and 2 are oppositely charged electrically. Thus, as shown in FIG. 3, in a typical arrangement, the sets of plates 1 are connected together and to one side of an exciting means or charging means 20, while the sets of plates 2 are connected together and to the other side of the exciting means 20. The exciting means 20 are shown diagrammatically as a battery but it will be understood that any suitable direct current source may be utilized such as a battery, an electromagnetic generator of conventional type, an electrostatic generator, or any other suitable source of direct current capable of supplying the desired excitation voltage and current. The load 21 which may be of any desired type, is connected as shown in FIG. 3 across the oppositely charged sets of plates.

In operation, the shaft 11, which extends out of the housing 18 through a gas-tight seal 22 of any suitable type, is driven by a prime mover (not shown) at the desired speed of rotation. The movable plates 10 are thus driven continuously between positions where the radial lobes of the plates 10 are in axial alignment with the stationary plates 1 and 2 and positions where they are out of alignment with the plates 1 and 2. It will be seen that the generator functions as a variable capacitor which is continuously driven between positions of maximum and minimum capacitance. When the movable plates 10 are exactly aligned with the stationary plates 1 and 2 the capacitance has its maximum value. The sets of plates 1 and 2 are charged at this time by the excitation source 20 with a voltage equal to that of the excitation source. When the lobes of the plates 10 have moved to a position intermediate the sets of stationary plates, or completely out of alignment with them, as shown in FIG. 3, the capacitance has reached its minimum value. The voltage of any capacitor is equal to the charge divided by the capacitance, and since the charge on the plates 1 and 2 remains essentially constant, or at least changes relatively slowly, the decrease in capacitance of the generator results in a corresponding increase of the voltage applied to the load 21. Thus, as the rotor shaft 11 is rotated, the capacitance continuously varies between maximum and minimum values and the output voltage supplied to the load rises and falls correspondingly so that a pulsating output voltage is produced.

The output voltage of the machine rises above the voltage of the excitation means 20 during the movement from maximum to minimum capacitance and an electric valve means 23 is connected between at least one set of stationary plates and the excitation source 20 to prevent reverse current flow from the generator to the excitation source. The valve means 23 is shown diagrammatically in the drawing as a rectifier cell, but it will be understood that any necessary number of rectifiers may be connected in any suitable manner to block reverse current, or that any suitable type of unidirectionally conductive electric valve means might be utilized for this purpose. A regulating device 24 of any suitable type has also been shown diagrammatically in the drawing. Any desired type of regulation may be utilized to control the voltage or current of the excitation source in any suitable manner to maintain the desired output voltage.

It will be seen that no electrical contact of any kind to the movable plates 10 is required. The stationary and movable plates are arranged in such a manner that the adjacent sets of stationary plates are oppositely charged and the movable plates cooperate with both sets of stationary plates to effectively vary the capacitance between them between maximum and minimum values. The movable plates 10 may be regarded as charge carriers but it is to be noted that the movable plates themselves are electrically neutral at all times. Thus, when the movable plates are aligned with the stationary plates, charges of opposite polarities are induced on adjacent radial lobes of the movable plates and these charges always exactly cancel each other since the same number of equal and opposite charges are always present on the movable plates. Thus, the movable plates are electrically neutral and no contact to them is required. As previously explained, this is very advantageous since it eliminates the necessity for brushes, or other types of sliding contact, which were required in previous types of electrostatic generators. The problems of maintenance and reliability associated with brushes or other contacts to movable members are thus eliminated, and the machine is very suitable for use in vacuum where brushes are not satisfactory or in locations where maintenance is difficult or impossible.

It should now be apparent that an electrostatic generator has been provided which has many advantages and which provides a very efficient and desirable source of high voltage direct current. The generator essentially provides a direct current output with a pulsating voltage which has a minimum value equal to the voltage of the excitation source 20 and a maximum value proportional to the ratio of maximum to minimum capacitance of the generator. Thus, a very large voltage amplification is possible, by proper design and spacing of the plates, and if necessary or desired suitable filtering or other means could be provided to smooth out the pulsating output voltage to whatever extent may be desired.

A four pole machine has been shown for the purpose of illustration having four sets of stationary plates and four lobes on the movable plates. It will, of course, be obvious that any desired even number of sets of stationary plates may be used with an equal number of lobes on the movable plates. It is not necessary for alternate sets of stationary plates to be oppositely charged, as the oppositely charged sets of plates may be arranged in any manner as long as there is an equal number of sets of stationary plates of each polarity. The shape or configuration of the plates may be varied from that shown, if desired, and the output voltage waveform may be varied in this way. Any desired type of excitation means may be utilized, and multistage generator arrangements are possible in which the output of each generator is used for excitation of the succeeding generator thus, in effect, cascading machines and making it possible to obtain very high voltages in a simple and efficient manner. The electrical circuit shown in FIG. 3 is of course only illustrative and any suitable circuit arrangement may be used.

It will be noted that the mechanical construction of the machine is quite simple so that it can readily be built at relatively low cost. The spacing between the plates, and the thickness of the plates themselves, can be made quite small, being determined only by the necessary dielectric strength between the plates and the necessary mechanical strength of the plates. The generator thus can be made of minimum size and weight for a given output.

A particular embodiment of the invention has been shown and described in detail for the purpose of illustration, but it will be apparent that various modifications and other embodiments are possible, and the invention is not restricted to the particular details of construction shown, but in its broadest aspects it includes all equivalent embodiments and modifications.

We claim as our invention:

1. An electrostatic generator comprising at least two sets of stationary conducting plates, each set of stationary plates including a plurality of similar plates disposed in longitudinal alignment, the plates of each set being spaced apart and electrically connected together, said sets of stationary plates being disposed in parallel relation and spaced apart angularly about an axis parallel to the sets of plates, a set of movable conducting plates mounted for rotation about said axis, said set of movable plates including a plurality of similar plates disposed in longitudinal alignment, the movable plates being spaced apart to pass through the spaces between the plates of the stationary sets of plates when the set of movable plates is rotated, whereby the movable plates move between positions in substantial alignment with all the sets of stationary plates and positions out of alignment with all the stationary plates, means for insulating the sets of stationary plates from each other and from the movable plates, exciting means for applying electrical charges of opposite polarity to adjacent sets of stationary plates, and means for connecting a load across the sets of stationary plates of opposite polarity.

2. An electrostatic generator comprising at least two sets of stationary conducting plates, each set of stationary plates including a plurality of similar plates disposed in longitudinal alignment, the plates of each set being spaced apart and electrically connected together, said sets of stationary plates being disposed in parallel relation and spaced apart angularly about an axis parallel to the sets of plates, a set of movable conducting plates mounted for rotation about said axis, said set of movable plates including a plurality of similar plates disposed in longitudinal alignment, each of said movable plates having a number of equally spaced radial projections thereon equal to the number of sets of stationary plates, the movable plates being spaced apart to pass through the spaces between the plates of the stationary sets of plates when the set of movable plates is rotated, means for insulating the sets of stationary plates from each other and from the movable plates, exciting means for applying electrical charges of opposite polarity to adjacent sets of stationary plates, and means for connecting a load across the sets of stationary plates of opposite polarity.

3. An electrostatic generator comprising at least two sets of stationary conducting plates, each set of stationary plates including a plurality of similar plates disposed in longitudinal alignment, the plates of each set being spaced apart and electrically connected together, said sets of stationary plates being disposed in parallel relation and spaced apart angularly about an axis parallel to the sets of plates, a set of movable conducting plates mounted for rotation about said axis, said set of movable plates including a plurality of similar plates disposed in longitudinal alignment, each of said movable plates having a number of equally spaced radial projections thereon equal to the number of sets of stationary plates, the movable plates being spaced apart to pass through the spaces between the plates of the stationary sets of plates when the set of movable plates is rotated, means for insulating the sets of stationary plates from each other and from the movable plates, exciting means for applying electrical charges of opposite polarity to adjacent sets of stationary plates, means for connecting a load across the sets of stationary plates of opposite polarity, and electric valve means connected between the stationary plates of one polarity and the exciting means.

4. An electrostatic generator comprising a stator member and a rotor member, the stator member including spaced end plates, a plurality of conducting rods extending between the end plates and insulated therefrom, a plurality of similar conducting plates supported on said rods, said plates being disposed in longitudinally aligned sets and the sets being angularly spaced apart around the longitudinal axis of the generator, the plates of each set being longitudinally spaced apart and being in electrically conductive relation with each other, said rotor member including a rotatable shaft and a plurality of conducting rotor plates mounted on the shaft, said rotor plates each having a number of radial projections equal to the number of sets of stator plates, the rotor plates being longitudinally spaced apart to pass through the spaces between the longitudinally spaced stator plates, exciting means for applying electrical charges of opposite polarity to adjacent sets of stator plates, and means for connecting a load across the sets of stator plates of opposite polarity.

5. An electrostatic generator comprising a stator member and a rotor member, the stator member including spaced end plates, a plurality of conducting rods extending between the end plates and insulated therefrom, a plurality of similar conducting plates supported on said rods, said plates being disposed in longitudinally aligned sets and the sets being angularly spaced apart around the longitudinal axis of the generator, the plates of each set being longitudinally spaced apart and being in electrically conductive relation with each other, said rotor member including a rotatable shaft and a plurality of conducting rotor plates mounted on the shaft, said rotor plates each having a number of radial projections equal to the number of sets of stator plates, the rotor plates being longitudinally spaced apart to pass through the spaces between the longitudinally spaced stator plates, exciting means for applying electrical charges of opposite polarity to adjacent sets of stator plates, means for connecting a load across the sets of stator plates of opposite polarity, and electric valve means connected between the sets of stator plates of at least one polarity and the exciting means.

References Cited by the Examiner

UNITED STATES PATENTS

| 479,941 | 8/92 | Henry | 310—6 |
|---|---|---|---|
| 2,009,503 | 7/35 | Landwerlin | 310—6 |
| 2,194,839 | 3/40 | Van De Graaff et al. | 310—6 |
| 2,756,352 | 7/56 | Felici et al. | 310—6 |
| 3,013,201 | 12/61 | Goldie | 322—2 |

OTHER REFERENCES

Publication: The Review of Scientific Instruments, vol. No. 11, issue No. 2, pp. 54–56, February 1940, by J. G. Trump et al.

LLOYD McCOLLUM, *Primary Examiner.*

MILTON O. HIRSHFIELD, *Examiner.*